(No Model.) 3 Sheets—Sheet 2.

E. W. BEMIS.
MILLING MACHINE.

No. 506,620. Patented Oct. 10, 1893.

Witnesses
Chas. F. Schmelz
Emma Hester

Inventor
Edgar W. Bemis,
By his Attorney
Rufus B. Fowler (No Model.) 3 Sheets—Sheet 3.
E. W. BEMIS.
MILLING MACHINE.
No. 506,620. Patented Oct. 10, 1893.
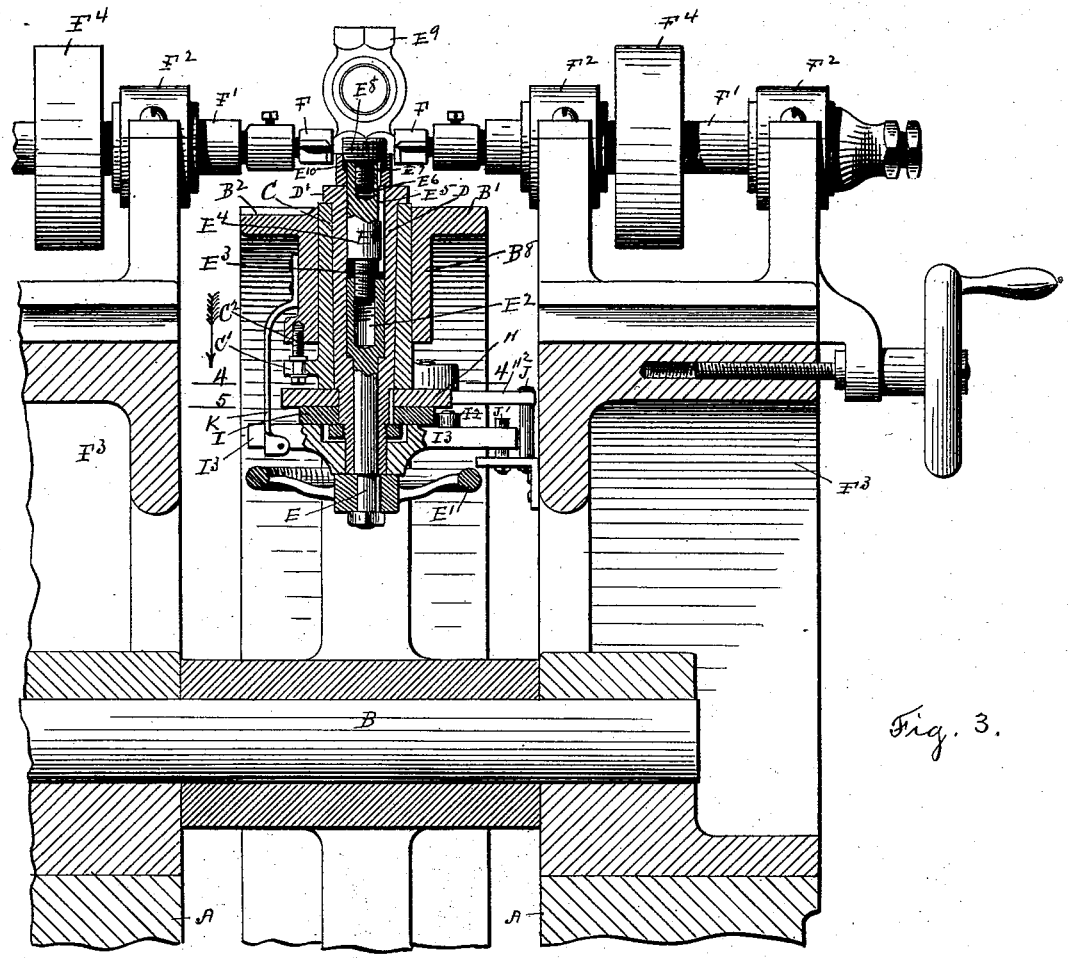
Fig. 3.
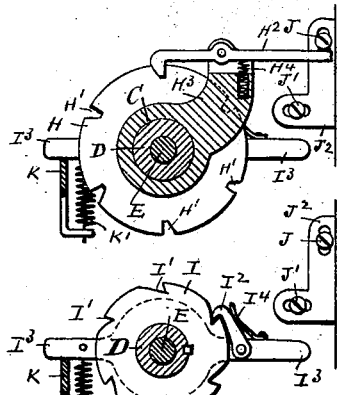
Fig. 4.
Fig. 5.
Witnesses
Inventor
Edgar W. Bemis,
By his Attorney
Rufus B. Fowler

UNITED STATES PATENT OFFICE.

EDGAR W. BEMIS, OF WORCESTER, MASSACHUSETTS, ASSIGNOR TO THE PRATT & WHITNEY COMPANY, OF HARTFORD, CONNECTICUT.

MILLING-MACHINE.

SPECIFICATION forming part of Letters Patent No. 506,620, dated October 10, 1893.

Application filed May 26, 1892. Serial No. 434,497. (No model.)

*To all whom it may concern:*

Be it known that I, EDGAR W. BEMIS, a citizen of the United States, residing at Worcester, in the county of Worcester and State of Massachusetts, have invented a new and useful Improvement in Milling-Machines, of which the following is a specification, reference being had to the accompanying drawings, forming a part of the same, and in which—

Figure 1:
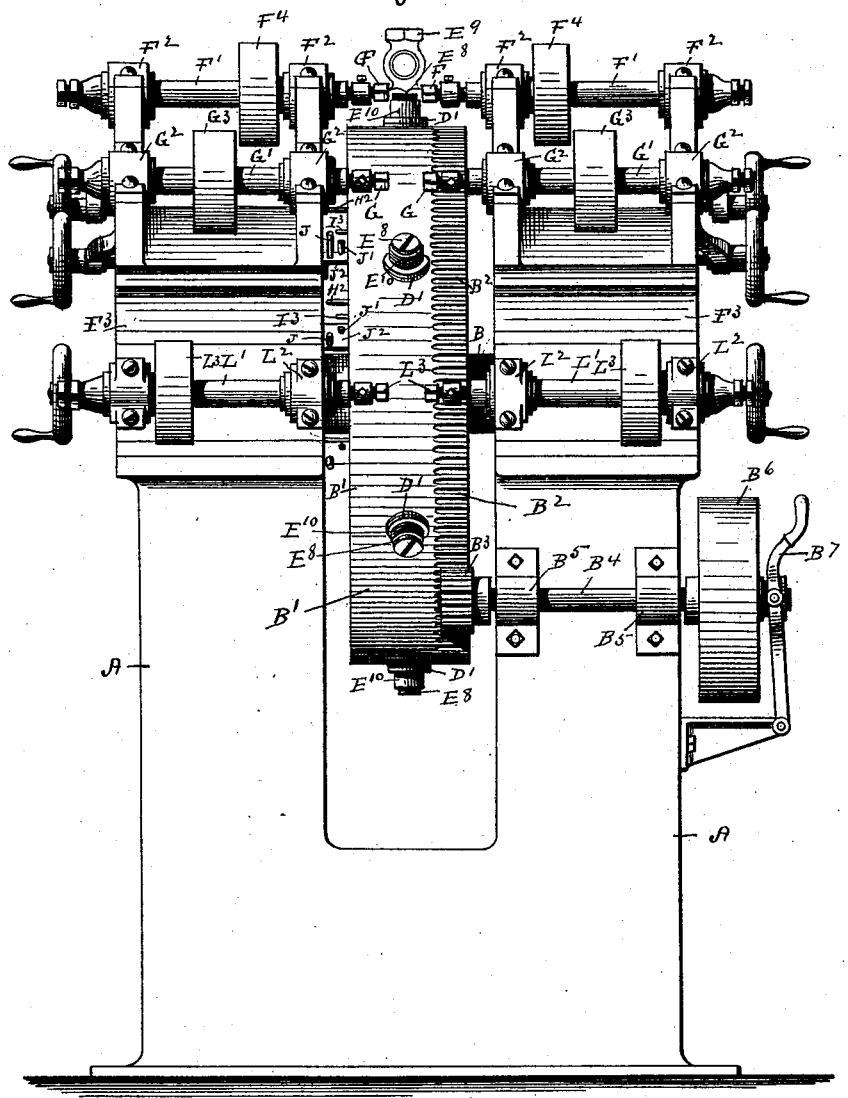
Figure 2:
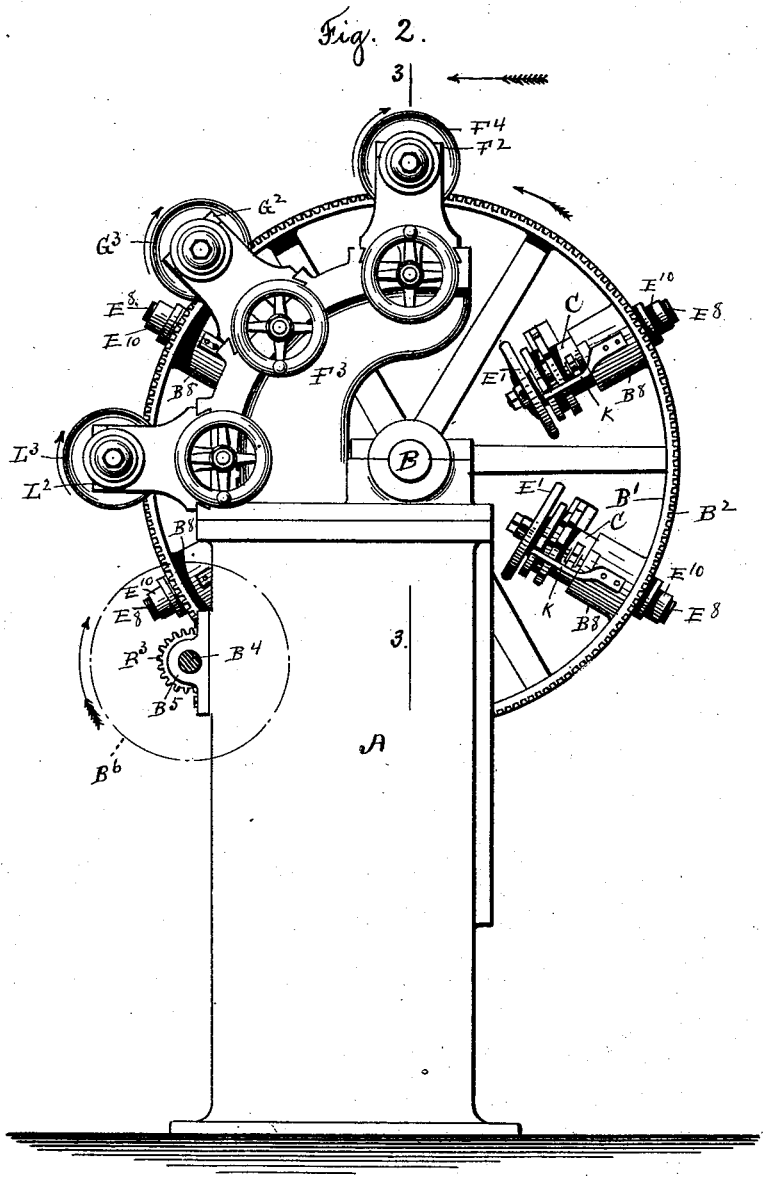

Figure 1 represents a rear view of the machine; Fig. 2 a side view; Fig. 3 a vertical sectional view of a portion of the machine on line 3, 3, Fig. 2. Fig. 4 is a sectional view of one of the work holding mechanisms on line 4, 4, Fig. 3, and Fig. 5 is a sectional view of the same on line 5, 5, Fig. 3.

Similar letters refer to similar parts in the different figures.

My invention relates to a milling machine designed to finish the sides of nuts, flanges of valves, and similar work; and the machine which is made the subject of the illustration in the accompanying drawings is designed to finish the sides of hexagonal forms, as nuts, flanges of steam and water valves and work of a similar character.

Referring to the accompanying drawings, A denotes a supporting stand or base upon which the operating mechanism is mounted.

B is a horizontal shaft journaled in bearings supported by the stand A and carrying a drum B' upon which the work is held. Upon one edge of the outer face or periphery of the drum B' are the gear teeth $B^2$, which are engaged by a pinion $B^3$ upon a driving shaft $B^4$, journaled in bearings $B^5$ and carrying a belt pulley $B^6$ to which power is imparted and which runs loosely upon the shaft $B^4$, having a clutch connection therewith of any known form of construction and operated by the pivoted lever handle $B^7$ in the well known manner common to clutching mechanisms. The drum B' is provided upon its inner surface with hubs $B^8$, within which are placed the devices for clamping the work in position, one of which is shown in central sectional view in Fig. 3 and comprising a sleeve C, having upon one side a slotted lug, or flange C' to receive a screw $C^2$ entering the end of the hub $B^8$ and by which the radial position of the sleeve C is determined. Within the sleeve C is a sleeve D provided with a flange D' resting upon the outer end of the sleeve C. Within the sleeve D is a spindle E having a hand wheel E' attached to its inner end and being provided with a concentric screw threaded chamber $E^2$, receiving the screw threaded section $E^3$ of the sliding spindle $E^4$, which is held from turning independently of the sleeve D by a spline $E^5$, but permitting a radially sliding motion of the spindle $E^4$ within the sleeve D, as actuated by the rotation of the spindle E. The outer end of the sliding spindle $E^4$ is provided with a concentric screw threaded chamber $E^6$ to receive the screw threaded shank $E^7$, of a screw threaded plug $E^8$ upon which a valve $E^9$ is secured. The loose ring $E^{10}$ is placed upon the flanged end of the sleeve C, against which the end of the valve $E^9$ is clamped in proper position to be acted upon by rotating milling tools F, F, carried by spindles F' which are journaled in bearings $F^2$ mounted upon the frame-work $F^3$ and driven through the belt pulleys $F^4$.

The work is placed upon the drum B' in the following manner: The spindle E is rotated by the hand wheel E', causing the sliding spindle $E^4$ to be pushed radially out of the sleeve, far enough to allow the valve, or other work to be finished, to be screwed upon the plug $E^8$. The motion of the hand wheel E' is then reversed drawing the sliding spindle $E^4$ radially toward the center of the drum and bringing the end of the work firmly against the edge of the ring $E^{10}$; the rotating spindle E acting as a check nut and producing sufficient friction upon the work to prevent its becoming loose during the operation of milling. The drum B' is rotated slowly and continuously and the work is applied successively to the screw threaded plugs $E^8$ at the front of the machine, so it will be carried in the direction of the arrow I, Fig. 2 between the first pair of milling tools F, F, causing two opposite sides of the work to be finished. As the work passes through the space between the milling tools F, F, the rotation of the drum B' will carry the work already acted upon by the tools F, F, forward between similar tools G, G, carried in shafts G', G', journaled in bearings $G^2$, $G^2$, supported on the frame-work $F^3$ and driven by pulleys $G^3$, $G^3$. During the passage of the work between the milling tools F, F, and G, G, the work is partially rotated in order to present new and unfinished sides to the action of the milling tools G, G. This rotation of the work is automatically effected by turning the sleeve D one-sixth of a revolution, in case of work having hexagonal sides, and securely locking the sleeve during the operation of milling. The sleeve D is rotated and locked by the following mechanism: Attached to the sleeve D is a locking plate H having six equi-distant notches H', which are successively engaged by a latch H², pivoted upon an arm H³ projecting from the side of the sleeve C. A spring H⁴ held by the arm H³ serves to hold the latch in engagement with the locking plate. Below the locking plate H and attached to the sleeve D is a ratchet I provided with six equi-distant teeth I' and engaged by a pawl I², pivoted upon a vibrating arm I³ and held in engagement with the ratchet teeth by a spring I⁴.

Fixed studs J, J' are adjustably held in a bracket J² attached to the frame F³. As the drum B' is rotated and the work carried from between the milling tools F, F, the latch H² is brought in contact with the stud J, causing it to be moved out of engagement with the locking plate H, when one end of the vibrating arm I³ is brought in contact with the stud J', arranged to impart an angular movement to the arm and rotate the sleeve C one-sixth of a revolution and allowing the latch H² to engage the next succeeding notch in the locking plate H before the work reaches the second set of milling tools G, G. Fastened to the hub B⁸ is an arm K extending downward to serve as a stop for the vibrating arm I³ which is connected with the end of the arm K by a spring K' so that the tension of the spring will reverse the movement of the arm I³ when it is released from the stud J' and carry the pawl I² into engagement with the next succeeding tooth upon the ratchet I. In like manner the work is again rotated one-sixth of a revolution as it passes from the milling tools G, G, to the third set of milling tools L, L, carried by spindles L', L', journaled in bearings L², L², supported upon the frame F³ and driven by pulleys L³, L³. As the drum B' rotates, the finished work having passed between the successive series of milling tools and brought to the front of the machine is removed and new pieces substituted.

The ring E¹⁰ is a loose ring so as to be readily removed and exchanged for rings of different widths and thereby vary the position of the work. The machine illustrated in the accompanying drawings is adapted to finish the sides of hexagonal work and for that purpose three pairs of milling tools are furnished, each pair milling two opposite sides simultaneously.

The machine can be adapted to octagonal work by the addition of another pair of milling tools and the modification of the work rotating mechanism, so as to produce four partial rotations of the work in place of three, as described, and each turning the work one-eighth of a revolution instead of one-sixth and in similar manner the machine can be adapted to any class of work having a greater or less number of sides than those described.

What I claim as my invention, and desire to secure by Letters Patent, is—

1. In a milling machine, the combination of a drum, connected mechanism by which said drum is rotated, a series of spindles held radially in said drum and having their outer ends projecting beyond the periphery of said drum, and adapted to receive the work, connected mechanism, by which said spindles are moved radially toward the center of said drum, whereby the work held upon the projecting outer ends of said spindles is clamped in position and held from turning, substantially as described.

2. In a milling machine, the combination of a drum, connected mechanism by which said drum is rotated, a series of spindles held radially in said drum, screw threaded plugs carried by the outer ends of said spindles and projecting beyond the periphery of said drum to receive the work, connected mechanism by which said spindles are moved radially, whereby the work carried upon said screw threaded plug is clamped in position and held from rotation, substantially as described.

3. In a milling machine, the combination of a drum, connected mechanism by which said drum is rotated, a series of spindles held radially in said drum, screw threaded plugs carried by the outer ends of said spindles and projecting beyond the periphery of said drum to receive the work, a loose removable ring inclosing said screw threaded plug with its inner edge supported, and connected mechanism by which said spindles are moved radially, whereby the work carried by said screw threaded plugs is clamped against said removable ring, substantially as described.

3. In a milling machine, the combination of a drum arranged to rotate continuously upon a horizontal axis, a series of spindles held radially in said drum with their ends projecting beyond the periphery of said drum to receive the work, said spindle being capable of a radially sliding motion by which the work held on their outer ends is clamped in position upon the periphery of said drum and also of an intermittent rotating motion, whereby they are turned to present different sides of the work to the cutting tools and connected operating mechanism by which said spindles are intermittently rotated by the rotary movement of said drum, substantially as described.

5. In a milling machine, the combination with the milling tools and a rotating drum, of a sleeve D journaled radially in said drum, a spindle E⁴ held concentrically in said sleeve and having a spline connection therewith, a screw threaded plug E⁸ held in said spindle and upon which the work is carried, a rotating spindle E held from longitudinal movement in said sleeve and provided with a screw threaded chamber $E^2$ engaging a screw threaded section upon said sliding spindle $E^4$ and a hand wheel $E'$ upon said rotating spindle, substantially as described.

6. In a milling machine, the combination of a rotating drum $B'$ upon which the work is carried to the milling tools, a sleeve D journaled in said drum, a work holding spindle held in said sleeve, a locking plate H carried by said sleeve, a latch held upon a fixed bracket and engaging said locking plate to hold the sleeve from rotation and a stop arranged in the path of said latch as the drum $B'$ is rotated, whereby said latch is disengaged from said locking plate, substantially as described.

7. In a milling machine, the combination of a rotating drum $B'$ upon which the work is carried to the milling tools, a sleeve D journaled in said drum, a work holding spindle held in said sleeve, a ratchet wheel I carried by said sleeve, a vibrating arm, a pawl carried by said arm and engaging said ratchet wheel and a stop arranged in the path of said arm as the drum $B'$ is rotated, whereby an angular motion is imparted to said arm and the work partially rotated, substantially as described.

8. In a milling machine, the combination of a drum arranged to rotate continuously about a horizontal axis, connected mechanism by which said drum is rotated, a series of hubs projecting radially from the inner surface of said drum, work carrying devices journaled in said hubs, connected locking mechanism by which said work carrying devices are held, connected mechanism by which said work carrying devices are rotated, comprising a pawl and ratchet, and a series of stops held by the fixed frame-work of the machine, and placed in the path of said locking and said rotating mechanisms, whereby they are intermittently operated by the continuous rotation of said drum, substantially as described.

Dated this 10th day of May, 1892.

EDGAR W. BEMIS.

Witnesses:
RUFUS B. FOWLER,
EMMA KESTER.